(12) United States Patent
Freundt

(10) Patent No.: US 12,151,901 B2
(45) Date of Patent: Nov. 26, 2024

(54) CONVEYOR WITH LINEAR AXIS DEVICES

(71) Applicant: Manz AG, Reutlingen (DE)

(72) Inventor: Martin Freundt, Esslingen (DE)

(73) Assignee: MANZ AG, Reutlingen (DE)

( * ) Notice: Subject to any disclaimer, the term of this patent is extended or adjusted under 35 U.S.C. 154(b) by 137 days.

(21) Appl. No.: 17/871,651

(22) Filed: Jul. 22, 2022

(65) Prior Publication Data

US 2024/0025656 A1 Jan. 25, 2024

(51) Int. Cl.
*B65G 35/06* (2006.01)
*B65G 25/02* (2006.01)

(52) U.S. Cl.
CPC ............. *B65G 35/06* (2013.01); *B65G 25/02* (2013.01)

(58) Field of Classification Search
None
See application file for complete search history.

(56) References Cited

U.S. PATENT DOCUMENTS

| | | |
|---|---|---|
| 4,251,957 A | 2/1981 | Terahara |
| 4,674,620 A * | 6/1987 | Inoue ..................... B23Q 7/005 198/465.1 |
| 5,737,960 A | 4/1998 | Brandstetter |
| 6,170,640 B1 | 1/2001 | Takayama |
| 2021/0129271 A1 | 5/2021 | Süss |

FOREIGN PATENT DOCUMENTS

| | | |
|---|---|---|
| DE | 19542205 A1 | 5/1997 |
| DE | 102016124742 U1 | 9/2013 |
| DE | 102016005160 A1 | 11/2016 |
| EP | 3173361 A1 | 5/2017 |
| JP | 6641779 B2 | 2/2020 |
| WO | 2003070420 A1 | 8/2003 |
| WO | 2009051468 A1 | 4/2009 |

* cited by examiner

*Primary Examiner* — Kavel Singh
(74) *Attorney, Agent, or Firm* — LUCAS & MERCANTI, LLP; Klaus P. Stoffel

(57) ABSTRACT

A conveying system including at least three axis devices for transporting component receiving portions for receiving a component and/or a component holder on a station path along a main transport direction in a component station. The axis devices each have a carriage assembly having one of the component receiving portions and having a feed apparatus for feeding the component receiving portion from an avoidance state to a transport position, and each have a linear shaft apparatus for moving the component receiving portion in the transport position along the station path in the main transport direction and for returning the component receiving portion in the avoidance state in a reverse direction. At least two of the axis devices are linear displacement axis devices which linearly move the component receiving portion in a spatial direction of the feed apparatus. The spatial directions each define a different projection direction in a projection plane perpendicular to the main transport direction.

14 Claims, 11 Drawing Sheets

CONVEYOR WITH LINEAR AXIS DEVICES

BACKGROUND OF THE INVENTION

The invention relates to a conveying system.

Conveying systems of this kind have the task of transporting workpieces to a station for processing. At the same time, conveying systems of this kind are used to clamp the workpieces in order to define their position relative to the station.

Depending on the requirements of the station, the conveying systems must arrange the workpieces relative to the station with limited tolerances and/or move said workpieces at a defined or at least known speed relative to the station or temporarily stop said workpieces.

The publication WO 03/070420 A1, which is likely the closest prior art, discloses a feeding device for feeding workpiece carriers along a belt conveyor using a conveyor which is driven in a controlled manner and which engages under the workpiece carrier in a transfer station arranged upstream of the processing station and lifts said workpiece carrier off the belt conveyor and transports said workpiece carrier in a raised state into the processing station and supports said workpiece carrier there during workpiece processing. The conveyor has two shafts, each of which moves a plate for holding the component carriers. The plates are moved by the axes in a circulating manner, wherein the plates are first passed through the processing station to deliver the workpiece carrier. The plates are subsequently lowered and, in the lowered state, moved back under the processing station to pick up a new workpiece carrier. Thus, the plates operate in a circulating principle.

SUMMARY OF THE INVENTION

An object of the present invention is to propose a conveying system, wherein the conveying system allows improved adaptation to the intended use.

The invention relates to a conveying system which is suitable and/or designed for conveying components and/or component holders for components. Thus, the conveying system can convey the components or component holders, optionally together with components.

In particular, the components can be configured as workpieces. Preferably, the components are elongate, in particular flat. Preferably, the surface of the components is flat. For example, the components can be implemented as plates or strips. The component holders have the function of holding the components such that the components are held by the component holders. Optionally, the components and/or the component holders form part of the conveying system. The component holders can hold exactly one component or at least one component.

The conveying system has at least three axis devices for transporting component receiving portions. In particular, the conveying system can have four, five, six or more axis devices with the same design or a different design. In particular, each axis device has at least one or exactly one component receiving portion. The component receiving portion forms a mechanical interface for receiving the exactly one or at least one component or the exactly one or at least one component holder. The component receiving portion can have members, such as pins, grippers, active members, in particular active grippers or the like, for holding the component and/or the component holder in a positionally defined manner. Preferably, the component or component holder is arranged so as to overlap the component receiving portion or even to be completely on the component receiving portion.

The axis devices are preferably designed independently of one another and can each have one or more individual axes, preferably exactly two individual axes for moving and/or manipulating the component receiving portion. Optionally, the axis device has further axes which, in particular, do not fulfill a shuttle function but allow fine alignment of the component or component holder in the sense of setting the component position, e.g. "angle adjustment" or "setting straight" or the like, in order to bring the component into the process region of the process unit, in particular of the print head, in spite of tolerances.

The axis devices each have the task of transporting the associated component receiving portion on at least one or exactly one station path along a main transport direction in at least one or exactly one component station. Preferably, the component receiving portions are transported in a straight line along a main transport direction on the station path. For example, the component station can have a process function and/or a manufacturing function and/or a measurement function. Particularly preferably, the component station has a process unit, wherein the component receiving portion is transported along the station path at the process unit for processing the component. Particularly preferably, the component receiving portion is transported continuously along the station path. Possible processes in the component station and/or relating to the process unit are: printing on surfaces of the components; measuring surfaces of the components; digitizing surface structures, colors and properties of the components; other processing, treatment and/or analysis of component surfaces; processing of materials or the components in a continuous or alternatively cyclic mode of operation.

Optionally, the conveying system includes the component station. Optionally, the component station defines a process direction via which the process takes place in the direction of the component or the component receiving portion.

The at least three, preferably some, in particular all of the, axis devices of the conveying system each have a carriage assembly and a linear shaft apparatus.

The linear shaft apparatus is used to move the component receiving portion along the station path in the main transport direction and to return the component receiving portion in a reverse direction. Preferably, the linear shaft apparatus has a length of more than 2 m, preferably more than 3 m, in particular more than 4 m. In principle, the linear shaft apparatus can be the last axis before the component holding portion and/or directly move said component receiving portion. However, it is preferred for the linear shaft apparatus to support the carriage assembly together with the component receiving portion. Particularly preferably, the linear shaft apparatus extends in parallel with the main transport apparatus. Particularly preferably, the linear shaft apparatus moves the component receiving portion and/or the carriage assembly in an oscillating and/or reciprocating manner in the main transport direction.

The carriage assembly has at least one or exactly one of the component receiving portions and a feed apparatus for feeding the component portion from an avoidance state to a transport position and/or in the reverse direction. The conveying system, in particular the axis device, in particular the linear shaft apparatus, is configured to move the component receiving portion in the transport position on the station path along the main transport direction. In particular, the component receiving portion is brought into the transport position by the feed apparatus and subsequently moved along the station path by the linear shaft apparatus. For example, after the station path, in particular after unloading the component receiving portion, or even during the return operation, the feed apparatus transfers the component receiving portion to the avoidance state. While it is preferably provided for the feed apparatus not to move the component receiving portion on the station path in the transport position, the feed apparatus can move the component receiving portion in the avoidance state during the return operation, in particular in the reverse direction to the main transport direction, for example as long as or insofar as this does not give rise to a collision of the component receiving portion.

It can be provided for the feed apparatus to have a separate actuator and/or at least one or exactly one separate axis apparatus for the feeding movement. Alternatively, the feed apparatus is driven via the linear shaft apparatus.

At least two of the axis devices are designed as linear displacement axis devices. The linear displacement axis devices, in particular the respective feed apparatuses, displace the particular component receiving portion in a linear direction, preferably exclusively in the linear direction and/or in a straight line. The displacement takes place in a spatial direction, in particular in a carriage coordinate system which is stationary in the carriage assembly and is carried along by the linear shaft apparatus. Viewing a projection plane oriented perpendicular to the main transport direction, the spatial directions each define a projection direction when the spatial directions are projected perpendicularly onto this projection plane.

It is additionally proposed for the projection directions of the at least two axis devices to be different. The differences can relate to the extension of the projection direction and/or the orientation of the projection direction. The projection direction is considered in particular for the transition from the avoidance state to the transport position.

One consideration here is that, by using different spatial directions and/or projection directions, the component receiving portions are not only moved to the transport position from different spatial directions, but rather the component receiving portions are also moved away in the reverse direction in different reverse spatial directions so that said component receiving portions reach an avoidance state in which the component receiving portions are spaced apart from one another. This provides a new option for returning the component receiving portions past one another and/or past the component station without collision. While the prior art only discloses a displacement of two component carriers in a common direction, the conveying system allows displacement to be implemented in different directions. This design allows improved adaptation of the conveying system to planned uses.

In a preferred design of the invention, the linear displacement axis device implements a parallel displacement of the component receiving portion, in particular in the carriage coordinate system. This makes the feed apparatus particularly easy to implement.

In a preferred further development of the invention, it is provided that, when the linear displacement axis device is stationary, i.e. when the linear shaft apparatus is deactivated, and/or in the carriage coordinate system, the spatial directions of the two axis devices, in particular of the two linear displacement axis devices, each lie in a linear displacement plane perpendicular to the main transport direction and/or are oriented substantially perpendicular to the main transport direction. "Substantially perpendicular" is defined as a deviation from perpendicular of less than 20°, preferably less than 15°, in particular less than 10° or 5°. This further development allows the provision of a Cartesian or quasi-Cartesian robot system which is particularly easy to implement in terms of design and/or control engineering.

In a preferred further embodiment of the invention, the component receiving portions in the station path define a uniform reference projection point on the projection plane. It is proposed for the projection directions to include this uniform reference projection point. It can be provided for the projection directions to intersect at the reference projection point. In this case, a first component receiving portion is moved to the transport position from a first spatial direction and a second component receiving portion is moved to the transport position from a second spatial direction, wherein the projection directions of the spatial directions assume an angle not equal to 0°.

In an alternative to this, the spatial directions and/or the projection directions are oriented antiparallel or substantially antiparallel. Thus, the spatial directions and/or projection directions are identical or at least similar, but oriented in opposite directions. In this case, angular deviations of less than 15°, preferably less than 10°, in particular less than 5°, can also be used. In this case, a first component receiving portion is moved to the transport position from a first spatial direction and a second component receiving portion is moved to the transport position from a second spatial direction, wherein the projection directions of the spatial directions assume an angle of 0°, possibly with said angular deviations from one another. In other words, the component receiving portions are moved in opposite directions in the direction of the transport position, and/or the spatial directions and/or the projection directions lie in a common plane. In a particularly simple embodiment of the invention, the spatial directions and/or the projection directions lie in a horizontal plane as the common plane. Visually speaking, the component receiving portions are fed into the station path from the left or right by the feed apparatus.

In possible further developments of the invention, the spatial directions and/or the projection directions can be in any desired intermediate angular range. Thus, the projection directions and/or spatial directions are not limited to a 12 o'clock-3 o'clock-6 o'clock-9 o'clock position, but can adopt any desired intermediate angle. For example, it can be provided for there to be an obtuse or acute intermediate angle between projection directions of two of the linear axis devices. In particular, there is no right angle (90°) or straight angle (180°).

Optionally, the following is proposed.

It is proposed for at least one, some or even all of the axis devices to be configured as a pivotal displacement device. The pivotal displacement device has the function of pivoting, in particular rotating and/or turning, the component receiving portion about a pivot region. The pivoting can be configured as a pure rotational movement, in which case the pivot region is configured as a pivot axis. Alternatively, the pivoting can be configured as a rotational/translational movement, wherein the pivot region is spatially extended. The pivoting moves the component receiving portion from the avoidance state to the transport position and/or in the reverse direction.

One consideration here is that, by pivoting, the component receiving portions are not only folded into the transport position from different directions, but rather the component receiving portions are also folded away in the reverse direction in different directions so that said component receiving portions reach an avoidance state in which the component receiving portions are spaced apart from one another. This provides a new option for returning the component receiving portions past one another and/or past the component station without collision. While the state of the art only discloses a displacement of two component carriers in a common direction, the conveying system allows folding away, optionally in different directions. This design allows improved adaptation of the conveying system to planned uses.

It is particularly preferred for the component receiving portion to be configured as an extension arm. The extension arm can be pivoted about the pivot region from the transport position to the avoidance state and/or in the reverse direction. It is preferred that, in an axial plan view, the pivot region is arranged on one side of the station path in the main transport direction in the region of the station path, and the extension arm extends over the station path towards the opposite side, at least in portions or completely. Here, the component receiving portion and/or the extension arm is in the transport position. Alternatively or additionally, it is preferred that, in the avoidance state, the pivot region is arranged on one side, in particular on the same side, of the station path, and the extension arm is arranged on the same side of the station path. With this embodiment, it is emphasized that the pivotal displacement axis device significantly reduces the collision contour of the component receiving portion, in particular during the return operation.

In a preferred further development of the invention, a pivot angle for the transition from the avoidance state to the transport position and/or in the reverse direction is at least 60°, preferably at least 75°, and in particular at least or exactly 90° and/or less than 120°, preferably less than 105°. Alternatively or additionally, it is preferred for the component receiving portion and/or the extension arm to be folded away at a right angle. This pivot angle ensures that the component receiving portion, in particular the extension arm, protrudes particularly far in the transport position and/or is folded away in a particularly space-saving manner in the avoidance state. Alternatively or additionally, the component receiving portion, in particular the extension arm, is transferred from a horizontal orientation in the transport position to a vertical orientation in the avoidance state and/or in the reverse direction.

It is particularly advantageous for the pivot region to be aligned with the main transport direction. Particularly preferably, the pivot region is defined by a pivot axis, wherein the pivot axis is oriented in parallel with the main transport direction. This allows a particularly space-saving and thus compact design.

The conveying system can be configured to be particularly compact manner if said conveying system has two of the pivotal axis devices, which are arranged on both sides of the station path. In this case, it can be provided for the component receiving portions to be pivoted from the avoidance state to the transport direction in opposite directions. This allows a symmetrical or at least a near-symmetrical structure. Alternatively, said component receiving portions can also be pivoted in the same direction if the design constraints will allow it.

In an alternative or further embodiment of the invention, the conveying system has two of the pivotal displacement axis devices, wherein the pivotal displacement axis devices are arranged on a common side of the station path. Here, it is preferred for the component receiving portions to be moved in the same direction, which enables a particularly compact design. Alternatively, said component receiving portions can also be pivoted in opposite directions if the design constraints will allow it.

It is possible for the component receiving portion to be pivoted or folded in the direction of the process unit or in the reverse direction.

It is proposed for at least two, preferably at least three, four, five or more of the axis devices to be configured in such a way that the component receiving portions are arranged and/or arrangeable laterally offset from one another in the region of the station path in the avoidance state. In particular, the component receiving portions are offset from one another in an offset direction during the optionally time-delayed crossing of the station path, wherein the offset direction is perpendicular to the main transport direction and perpendicular to a vertical and/or to the process direction.

Optionally, in addition, the component receiving portions are arranged and/or arrangeable vertically offset from one another.

One consideration of the invention is that, by offsetting the component receiving portions in the lateral direction, new possibilities are created for returning the component receiving portions past another and/or past the component station without collision. While the prior art discloses only a vertical offset, according to the invention a lateral offset is implemented with the conveying system. This design allows improved adaptation of the conveying system to planned uses. In particular, the lateral offset allows three or more axis devices to be used, whereas the prior art is limited to two such axes.

In a preferred further development of the invention, the component receiving portions are arranged laterally offset from one another in the avoidance state in such a way as to be able to travel, in the region of the station path without collision, past one another and/or past a component receiving portion which is moving through the station path S, in particular which is located in transport position. In particular, the respective carriage assemblies can also travel past one another and/or past the component station. This makes it possible for the component receiving portions of the at least two axis devices to be moved without collision and thus independently of one another, at least during the return operation and/or in the reverse direction. The region of the station path can correspond to the length of the component station in the main transport direction. However, it can be provided for the region of the station path to be formed by only a portion of the station path.

It is further preferred for the carriage assembly to utilize a return volume when returning the component receiving portion in the region of the station path. The cross section of the return volume is formed by the collision contour of the carriage assembly. It is provided for the return volumes of the two axis devices not to overlap or even to be spaced apart. This further development ensures that the carriage assemblies and thus the component receiving portions can travel past one another without collision.

In a preferred embodiment of the invention, at least two, some, or all of the component receiving portions can be arranged randomly along the station path. In particular, the component portions of the axis apparatus can be arranged randomly, which are arranged and/or arrangeable laterally offset in the avoidance state. Whereas, in the prior art, the two tool carriers can only be moved through the processing station alternately due to their design, the temporal offset and in particular the collision-free return operation mean that the component receiving portions can be moved through the station path in any desired order and thus randomly. In this embodiment, it is thus possible to always move the component receiving portion through the station path which, for example, is the first to be fitted with a component holder and/or with a component. Thus, if more than two axis devices are provided, any sequence can be achieved.

It is particularly preferred for the component receiving portions to be passed through the component station along the station path with as few gaps as possible in order to achieve maximum utilization of the component station. The utilization of the component station can be increased by using more axis devices. This is possible with the conveying system according to the invention since more than two axis devices, as known in the prior art, can be used due to the lateral offset. Furthermore, the random arrangement of the component receiving portions means that if the loading of a component receiving portion is delayed, it is not necessary to wait for this component receiving portion; instead, another component receiving portion can be queued.

In a preferred further development of the invention, the axis device, in particular some or all of the axis devices, has a supply apparatus for supplying the carriage assembly with energy, in particular electrical, pneumatic, hydraulic energy, control signals and/or for exchanging further signals, such as sensor signals. For example, the supply apparatus is configured as a drag chain and/or energy guiding chain which is dragged back and forth in the main transport direction. The energy guiding chain (also energy chain, e-chain or drag chain) is a component in mechanical engineering that guides and protects flexible cables and pneumatic or hydraulic lines. Cables of this kind are connected to a machine part, in this case the carriage assembly, which is constantly moved back and forth. Without a guide of this kind, which guarantees compliance with the smallest permissible bending radius of the cables, the cables would quickly be destroyed under the continuous load. Preferably, at least two, three, some or all of the axis devices are associated with a supply apparatus of this kind. The supply apparatus is permanently connected to the carriage assembly during operation, in particular in such a way that the carriage assembly is supplied with the energy and/or signals without interruption and/or disconnection. The lateral offset also allows the supply apparatuses to be laterally offset from one another so that they can be dragged independently of one another in the main transport direction. This further development supports the random arrangement of the component receiving portions along the station path.

The component holders—also referred to as shuttles—can be configured as passive component holders and/or clamps for the component. Thus, the component is arranged on the component holder and optionally fixed in place. Alternatively, the component holders can be configured as active component holders and fulfill other functions, for example. For instance, the component holders can have auxiliary axes for manipulating the component. For instance, the component holders can have rotary axes, pivot axes or linear axes. Alternatively or additionally, the component holders can have sensors, such as speed sensors, position sensors, temperature sensors, etc.

Alternatively or additionally, the component receiving portion can carry a sensor system that can be used for operation or diagnostics of the component holder (acceleration sensors, position and/or speed sensors, pressure sensors, temperature and radiation sensors (e.g., for measuring UV light curing lamps in the system).

Alternatively or additionally, the component holder can carry a sensor system that is used to monitor the component: pressure sensors, temperature sensors, force sensors, position sensors, vibration sensors and/or color sensors, etc.

Auxiliary axes can be located between the component holder and the component receiving portion; these auxiliary axes may be assignable to the component holder, or they provide an extension for an additional function and are separate from the component holder. The auxiliary axes can form a separate auxiliary device.

The active component holders can be supplied directly by the supply apparatus and/or indirectly by the carriage assembly.

In a particularly efficient implementation of the conveying system, it is provided for the feed apparatus to be configured as a single-axis apparatus. In principle, the feed apparatus can be implemented in any way desired, for example as a curved path, a rotary axis, a linear axis, etc. However, it is particularly cost-effective for said feed apparatus to be configured as a single-axis apparatus and/or to have only a single degree of freedom since only one drive motor is required and/or used in this case.

The operating mode and/or energy supply of the feed apparatus can be provided by an electrical connection, a pneumatic connection, a hydraulic connection and/or active mechanism or any other connection. The connection and/or active mechanism is preferably routed via the supply apparatus.

In possible embodiments of the invention, the feed apparatus performs an exclusively linear motion, an exclusively rotational motion or a coupled linear/rotational motion to move the component receiving portion between the avoidance state and the transport position.

The fact that the conveying system has axis devices that are each associated with a linear shaft apparatus means that the component receiving portions and/or carriage assemblies of the various axis devices can travel independently of one another. Thus, the component receiving portions and/or carriage assemblies can be loaded and unloaded without disrupting the flow of material in the at least one component station. This makes it possible for components to be fed continuously to the component station and the components in the component station to be processed continuously and thus efficiently. This is achieved in particular by the ability of the component receiving portions and/or carriage assemblies to be moved independently.

In one possible embodiment of the invention, at least one of the axis devices is configured as a linear pivotal axis device. In the linear pivotal axis device, the associated component receiving portion is pivoted in the carriage assembly by the feed apparatus 5. The pivoting is coplanar and/or in a common plane as occupied by the component receiving portion in the transport position. The linear pivotal axis device can also be referred to as a linear displacement axis device and/or a pivotal displacement axis device.

In a preferred further development of the invention, the or at least one linear displacement axis device is configured as a stroke displacement axis device, wherein the component receiving portion is able to be offset or is offset vertically and/or in parallel with the process direction by the feed apparatus. This further development is a special case since it provides for the component receiving portion to be returned only vertically offset in the avoidance state.

In a particularly preferred implementation of the invention, the conveying system has two stroke displacement axis devices of this kind, wherein said stroke displacement axis devices are arranged on a common side of the station path in the avoidance state. Insofar as said stroke displacement axis devices each have a supply apparatus, which is configured, for example, as a drag chain, said stroke displacement axis devices can travel down the station path in a predetermined sequence in a circulating manner. It is proposed for the conveying system to comprise at least one further linear displacement axis device and/or at least one pivotal displacement axis device. In this way, a particularly compact embodiment is provided for a conveying system having exactly three or at least three axis devices.

BRIEF DESCRIPTION OF THE DRAWING

Further features, advantages and effects of the invention will be apparent from the following description of preferred exemplary embodiments of the invention. In this description.

DETAILED DESCRIPTION OF THE INVENTION

Figure 1:
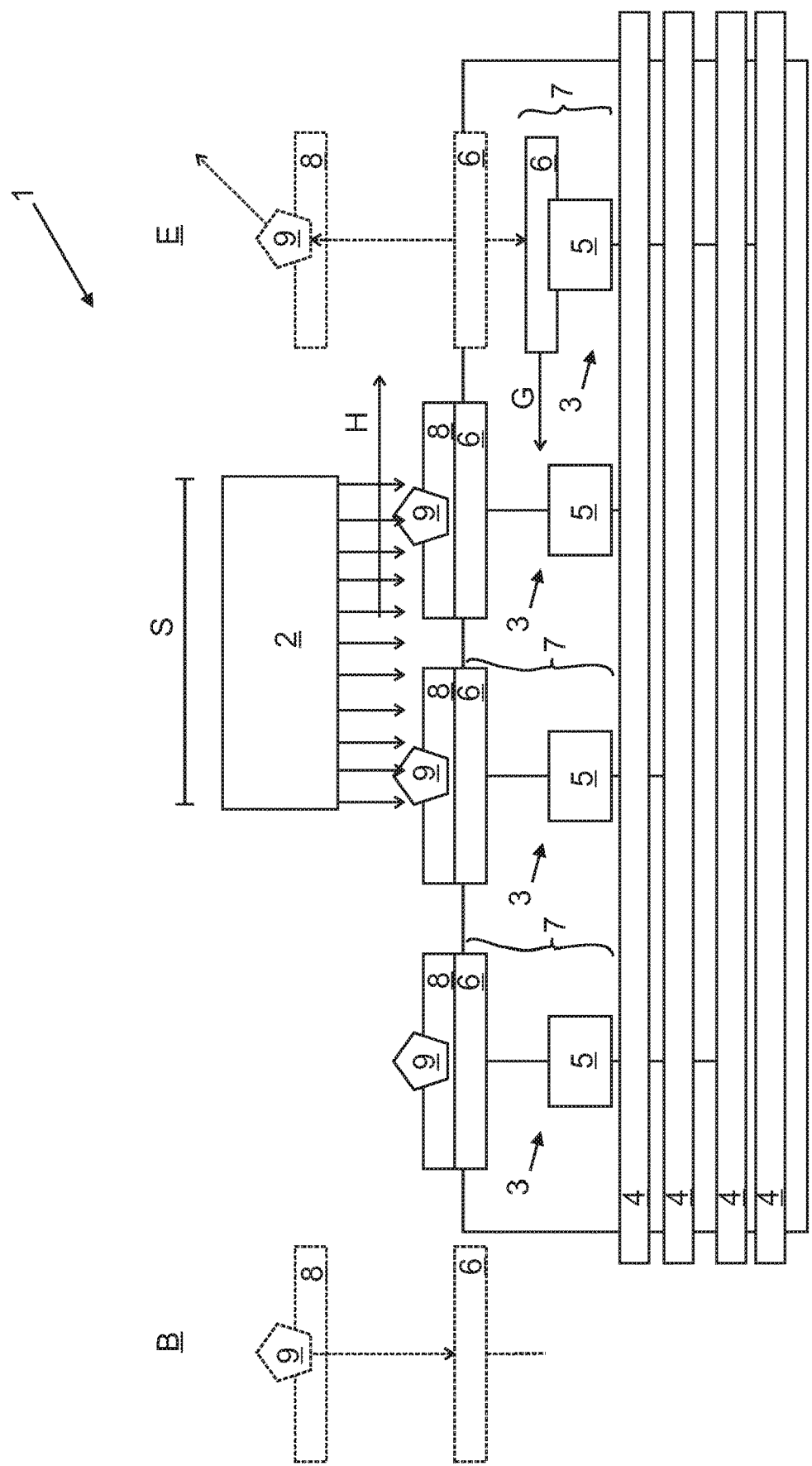
FIG. 1 is a highly schematized side view of a conveying system as one exemplary embodiment of the invention.

Corresponding or identical parts are provided with the same reference signs in the drawings.

FIG. 1 shows a highly schematized side view of a conveying system 1 as one exemplary embodiment of the invention. A component station 2 is shown, which optionally forms part of the conveying system 1. For example, the component station 2 can have a process head, a process unit or a processing head (not shown). A plurality of component stations 2 and/or processing heads can also be provided.

Figure 6:
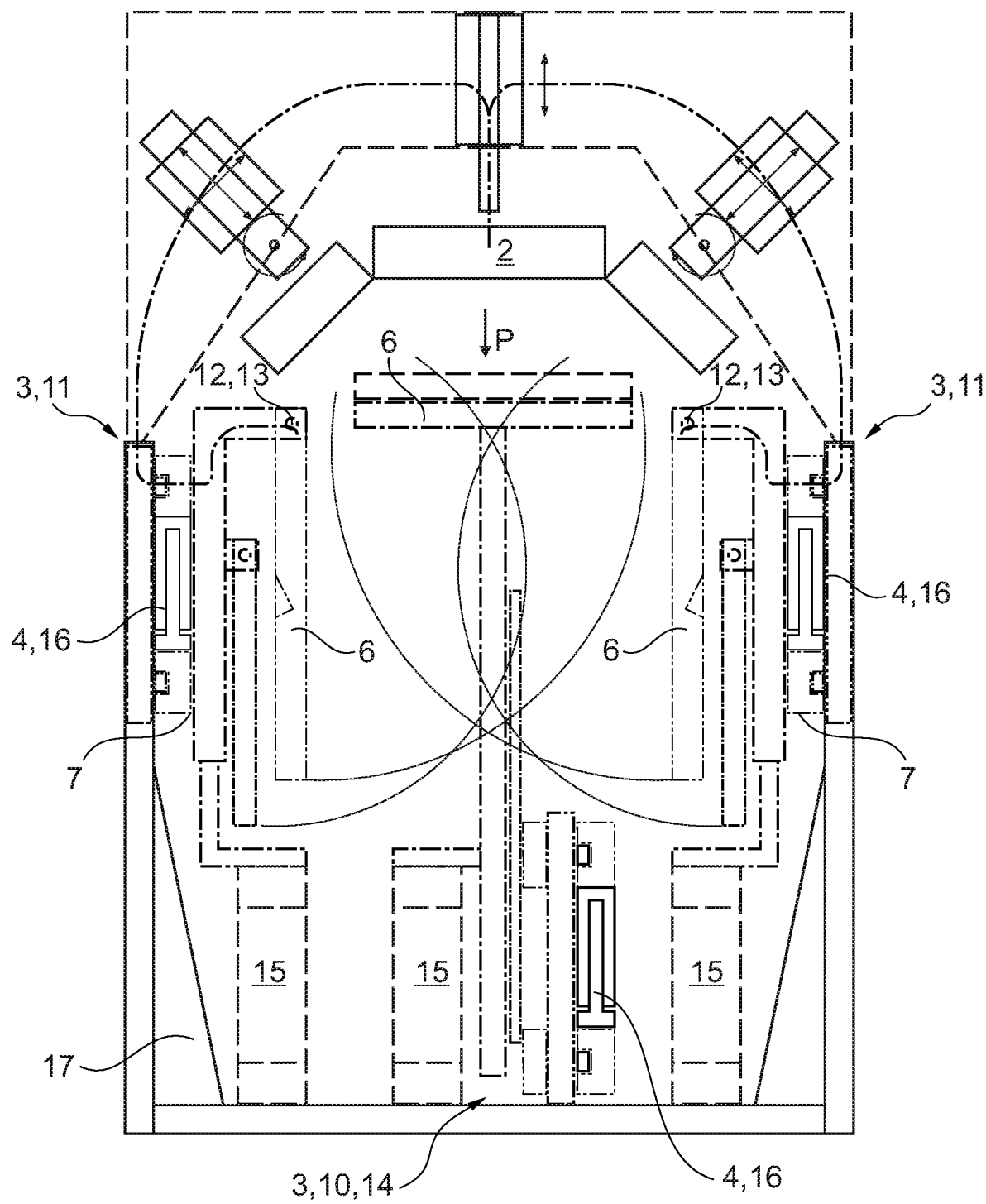
FIG. 6 is a highly schematized front view of a conveying system as one exemplary embodiment of the invention.

The conveying system 1 has a plurality of axis devices 3, each comprising a linear shaft apparatus 4, a feed apparatus 5 and a component receiving portion 6. Together, the feed apparatus 5 and the component receiving portion 6 form a carriage assembly 7. FIG. 6 shows one exemplary embodiment of a frame 17, wherein the frame 17 supports the axis devices 3. The frame 17 can also be in multiple parts. In the spirit of precision, the guide rails for the linear shaft apparatus 4 are preferably continuous and in particular are made in one part and/or in one piece. However, in the case of larger conveying systems 1 (e.g., with a guide rail length greater than 4 m), said guide rails can, due to the length, have butt joints that are rigidly connected in the conveying system.

The linear shaft apparatus 4 has the function of transporting the carriage assembly 7 in a main transport direction H as well as in a reverse direction G. In particular, each linear shaft apparatus 4 is configured to oscillate and/or reciprocate. For example, the linear shaft apparatus has a rail (not shown) on which the carriage assembly 7 is transported in the main transport direction H as well as in the reverse direction G.

The component receiving portion 6 has the function of receiving a component holder 8 and/or a component 9. The loading takes place, for example, upstream of the conveying system 1 in one or more loading stations B and downstream of the conveying system 1 in one or more unloading stations E. The loading station(s) B and the unloading station(s) E can also be configured as one common station. This can be implemented, for example, by allowing the component to be held securely in an "avoidance position".

After being loaded, the component receiving portions 6 are transported one after the other past the component station 2 on a station path S and, in the process, are processed by the component station 2, specifically in a process direction P as a working direction. The process direction P can be oriented perpendicular to the main transport direction H as shown, but other working directions are also possible. After processing, the component receiving portions 6 are unloaded in the unloading station E and transported back in the reverse direction G.

Along the station path S, the component receiving portions 6 are each in a transport position so that they can be processed in the correct position in the component station 2. In the reverse direction G, the component receiving portions 6 are each in an avoidance state so that they can be transported back without colliding with the component receiving portions 6 in the transport position. After the component receiving portions 6 are unloaded, it is only necessary that the avoidance state avoid collisions. In the unloading station E and/or in the loading station B, the component receiving portions 6 can assume any desired position.

The transition from the transport position to the avoidance state and/or in the reverse direction is implemented by the feed apparatus 5, which is transported on the linear shaft apparatus 4.

Figure 2:
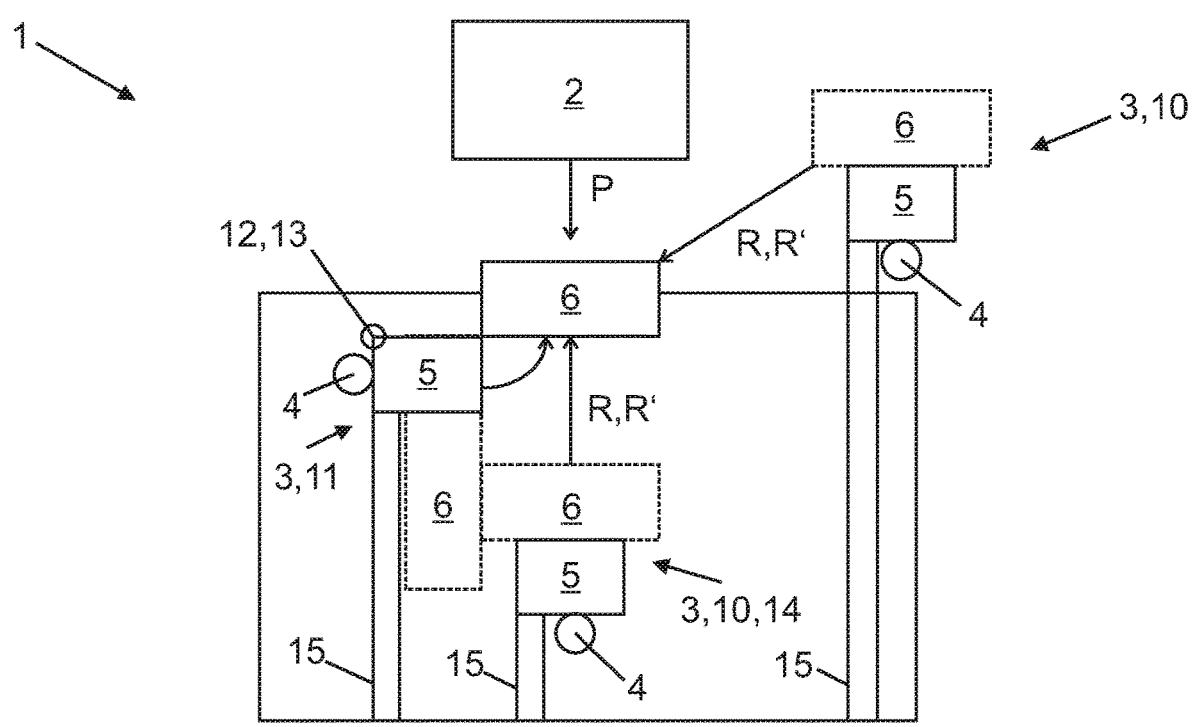
FIG. 2 is a highly schematized front view of a conveying system as one exemplary embodiment of the invention.

FIG. 2 is a schematic axial plan view of the conveying system 1 from FIG. 1, with only three axis devices 3 being shown to illustrate different types of axis devices 3.

Two of the axis devices 3 are configured as linear displacement axis devices 10. The linear displacement axis devices 10 each include the linear shaft apparatus 4, the feed apparatus 5 and the component receiving portion 6. The feed apparatus 5 moves the component receiving portion 6 from the avoidance state, in which the component receiving portion 6 is shown by dashed lines, to the transport position. The component receiving portion 6 is fed along a spatial direction R, wherein the spatial direction R results in a projection direction R' in the axial projection shown, wherein the spatial direction R and/or the projection direction P is in a straight line. In particular, the feeding is performed by a parallel displacement of the component receiving portion 6.

One of the axis devices 3 is configured as a pivotal displacement axis device 11. The pivotal displacement axis device 11 includes the linear shaft apparatus 4, the feed apparatus 5 and the component receiving portion 6. The feed apparatus 5 moves the component receiving portion 6 from the avoidance state, in which the component receiving portion 6 is shown by dashed lines, to the transport position.

The component receiving portion 6 is fed by pivoting the component receiving portion 6 about a pivot region 12, wherein the pivot region 12 is formed as a pivot axis 13 in this exemplary embodiment. In this exemplary embodiment, the pivot region 12 and/or the pivot axis 13 is oriented in the same direction as and/or in parallel with the main transport direction H.

One of the axis devices 3 is configured as a stroke displacement axis device 14, wherein the stroke displacement axis device 14 is a special case of the linear displacement axis device 10. The stroke displacement axis device 14 includes the linear shaft apparatus 4, the feed apparatus 5 and the component receiving portion 6. The feed apparatus 5 moves the component receiving portion 6 from the avoidance state, in which the component receiving portion 6 is shown by dashed lines, to the transport position. The component receiving portion 6 is fed along a spatial direction R, wherein the spatial direction R results in a projection direction R' in the axial projection shown, wherein the spatial direction R and/or the projection direction R' is in a straight line. In particular, the feeding is performed by a parallel displacement of the component receiving portion 6. In the case of the stroke displacement axis device 14, the component section 6 is offset vertically and/or in the process direction P.

Due to the use of the feed apparatuses 5, the component receiving portions 6 in the avoidance state are laterally offset from one another, in particular with respect to the process direction P and/or to the station path. This ensures that the component receiving portions 6 being returned can be moved past one another and/or past component receiving portions 6 in the transport position without collision in the region of the station path S. This feature has the further advantage that at least some of the component receiving portions can be arranged randomly along the station path S since they can overtake one another along the station path S, for example. In preferred embodiments, collisions are also avoided outside the station path S since the components 9 must already be traveling in a process-defined manner upon entering the station path S. Therefore, before and after the station path S by a length equal to at least one component length and/or component holder length, the feed apparatuses 5 must not move.

At least the feed apparatuses 5 require an energy supply and/or data communication. For this purpose, the axis devices 3 each have a supply apparatus 15, wherein the supply apparatus 15 is configured, for example, as a drag chain and/or energy guiding chain. As can be seen directly from FIG. 2, the supply apparatuses 15 can be transported along the main transport direction H independently of one another. In particular, it is not necessary to implement means for connecting and/or disconnecting the supply apparatuses 15. Rather, the supply apparatus 15 can remain continuously connected to the carriage assembly 7 and/or to an energy source.

Looking at the stroke displacement axis device 14 as a special case of a linear displacement axis device as well as the linear displacement axis device 10, it can be seen that the spatial directions R or the projection directions R' are different and, in particular, an intermediate angle not equal to 0° is provided between the projection directions R' in order to achieve the lateral offset. In contrast, in the case of the pivotal displacement axis device 11, the lateral offset is achieved by pivoting the component receiving portion 6 about the pivot region 12 or the pivot axis 13.

FIGS. 3*a* to 3*d* are schematic axial plan views of four different exemplary embodiments of the conveying system 1 from the front. While only linear displacement axis devices 10 are shown in these figures, these exemplary embodiments can also be altered by replacing one of the linear displacement axis devices 10 (for example, the leftmost linear displacement axis device 10 in each case) with the pivotal displacement axis device 11 from FIG. 2. It is also possible to use further pivotal displacement axis devices 11.

Figure 3A:
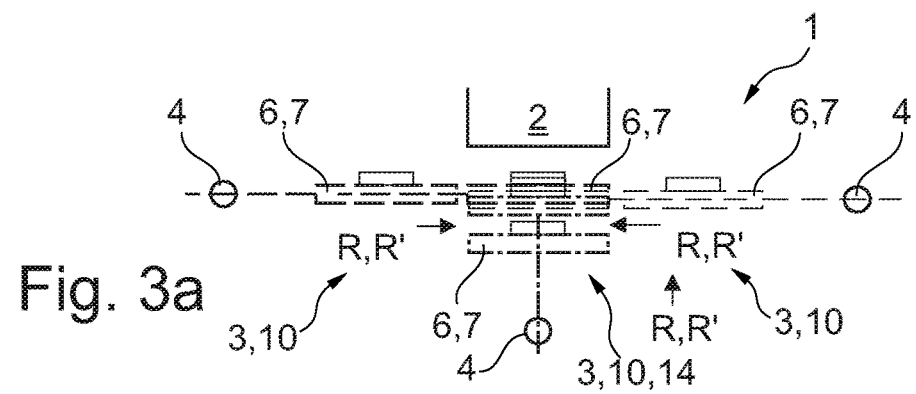
FIGS. 3a to d are highly schematized front views of conveying systems in front view as exemplary embodiments of the invention.

FIG. 3*a* shows the conveying system 11 with three linear displacement axis devices 10, wherein one of the three linear displacement axis devices 10 is configured as a stroke displacement axis device 14. Two of the linear displacement axis devices 10 lie in a common plane, in this case a horizontal plane. Each of the axis devices 3 in FIG. 3 a has a linear shaft apparatus 4 and a feed apparatus (not shown), wherein the feed apparatus and the component receiving portion 6 together form the carriage assembly 7.

During operation, the respective component receiving portions 6 are moved laterally into the station path S before the station path S and are moved out again by the feed apparatus 5 after the station path S. In this exemplary embodiment, the movement occurs in the horizontal plane such that the spatial direction R or the projection direction R' are arranged in opposite directions to one another. As described in FIG. 2, the stroke displacement axis device 14 provides the component receiving portion 6 by means of a vertical displacement. The three component receiving portions 6 can be randomly arranged on the station path S. The three spatial directions R or projection directions R' are oriented perpendicular to one another.

Figure 3B:
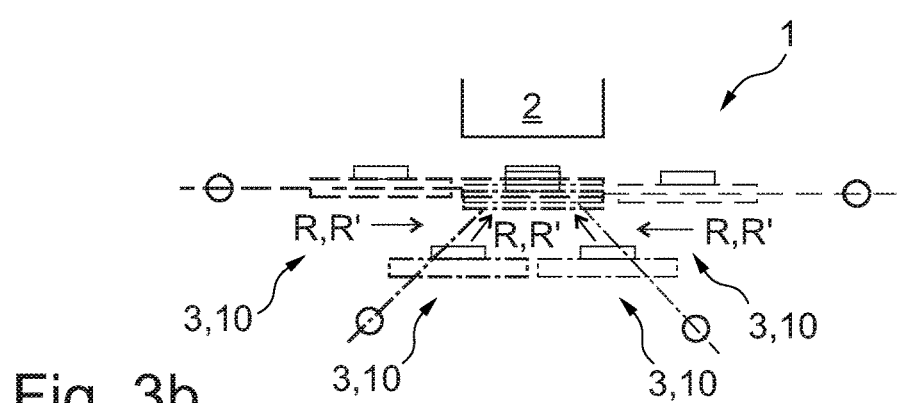

FIG. 3*b* shows the conveying system 1 with four linear displacement axis devices wherein two of the linear displacement axis devices 10 are arranged on the horizontal plane as in FIG. 3*a*. The other two linear displacement axis device 10 are arranged so that the spatial direction R or projection direction R' thereof assumes an intermediate angle of approximately 45° to the projection direction P.

Figure 3C:
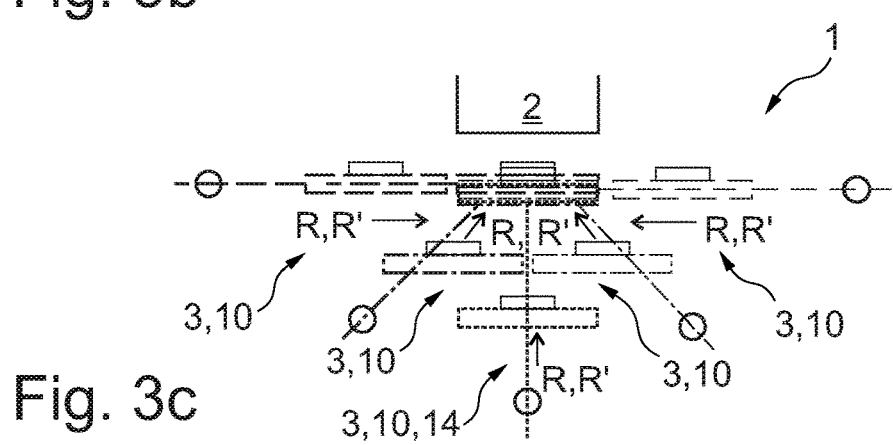

FIG. 3*c* shows the conveying system 1 with five linear displacement axis devices 10, wherein a stroke displacement axis device 14 is arranged between the lower two linear displacement axis devices 10.

Figure 3D:
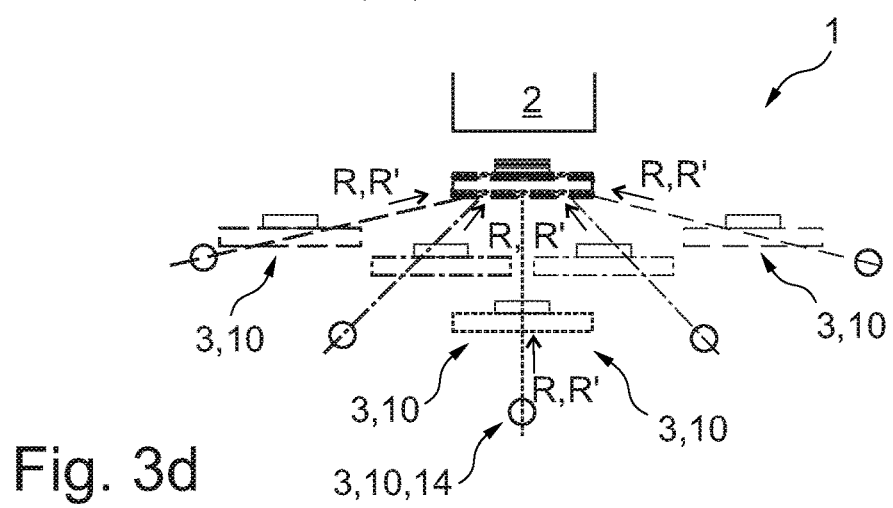

FIG. 3*d* shows a conveying system 1 with five linear displacement axis devices 10, wherein one of the linear displacement axis devices 10 is configured as a stroke displacement axis device 14, wherein the other linear displacement axis devices 10 are arranged at an intermediate angle not equal to 0° or 180°.

It should be noted in particular that the supply apparatuses 15 (not shown), in particular configured as a drag chain, for the axis devices 3 in FIGS. 3*a* to 3*d* are independent of one another such that they do not collide with one another.

Figure 4:
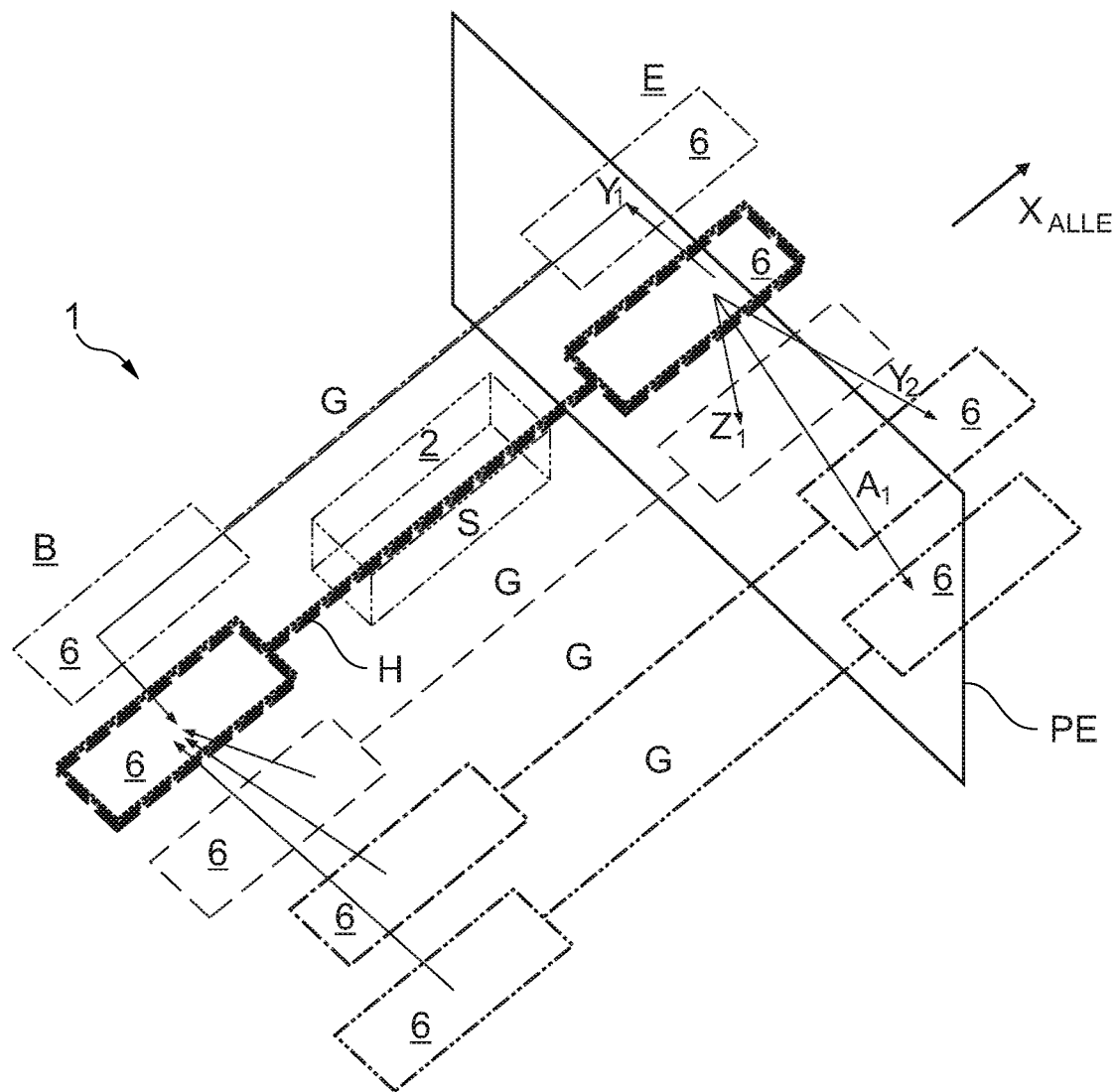
FIG. 4 is a highly schematized three-dimensional view of a conveying system as one exemplary embodiment of the invention.

In FIG. 4, a three-dimensional view of the conveying system 1 shown in FIG. 3*d* is given as an example to show the path of the component receiving portions 6. However, all component receiving portions 6 are shown in the same positions. In the region of the loading station B, the component receiving portions 6 are each in the avoidance state. From there, said component receiving portions 6 can be transferred to the transport position by the respective feed apparatuses 5. By transferring the component receiving portions 6 one after the other into the transport position, they can be passed through the component station 2 sequentially and/or one after the other. In the region of the unloading station E after the station path S, the component receiving portions 6, in particular after unloading the component 9 or the component holder 8 having the component 9, are transferred by the feed apparatus 5 from the transport position to the avoidance state and can be moved back towards the loading station B in the reverse direction G. Due to the lateral offset of the component receiving portions 6 and/or the different spatial directions R and/or the different projection directions R', in particular on a projection plane PE oriented perpendicular to the main transport direction H, the component receiving portions 6 can move past the station path S together with the component receiving portions 6 in the transport position and/or past the other component receiving portions 6 without collision. Provided that the distance and/or the different projection directions R' are selected accordingly, all the component receiving portions 6 can be positioned randomly at the beginning of the station path S. If the component receiving portions 6 overlap along the station path S in the avoidance state, they cannot be positioned randomly. Optionally, in addition, one or more pivotal displacement axis devices 11 can be used instead of one or more of the linear displacement axis devices 10 shown.

Figure 5A:
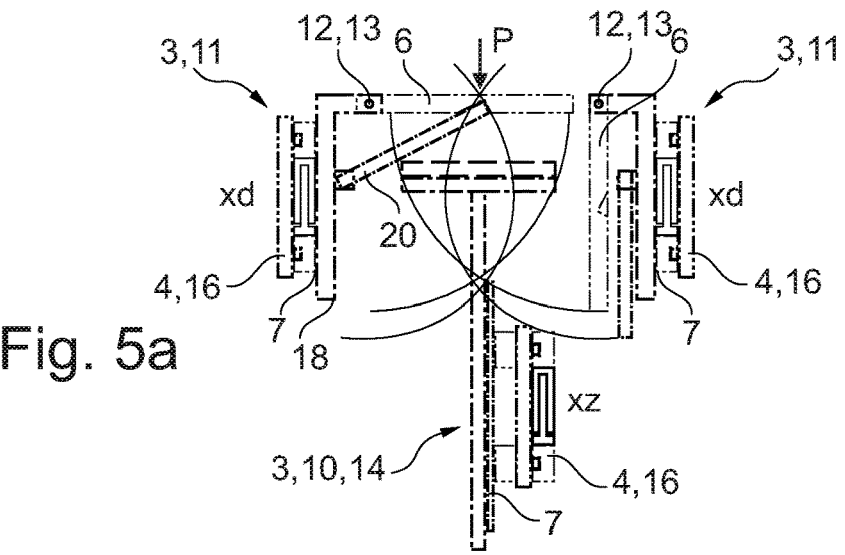
FIGS. 5a to c are highly schematized front views of conveying systems as further exemplary embodiments of the invention.

FIGS. 5*a, b* and *c* show a further exemplary embodiment of a conveying system 1, wherein said conveying system 1 comprises three axis devices 3, wherein two of the axis devices 3 are configured as pivotal displacement axis devices 11 and one of the axis devices 3 is configured as a linear displacement device 10, in this exemplary embodiment as a stroke displacement axis device 14.

The axis devices 3 each have a carriage assembly 7, wherein the carriage assembly 7 is guided in the main transport direction H by a guide 16 as part of the linear shaft apparatus 4.

Figure 5B:
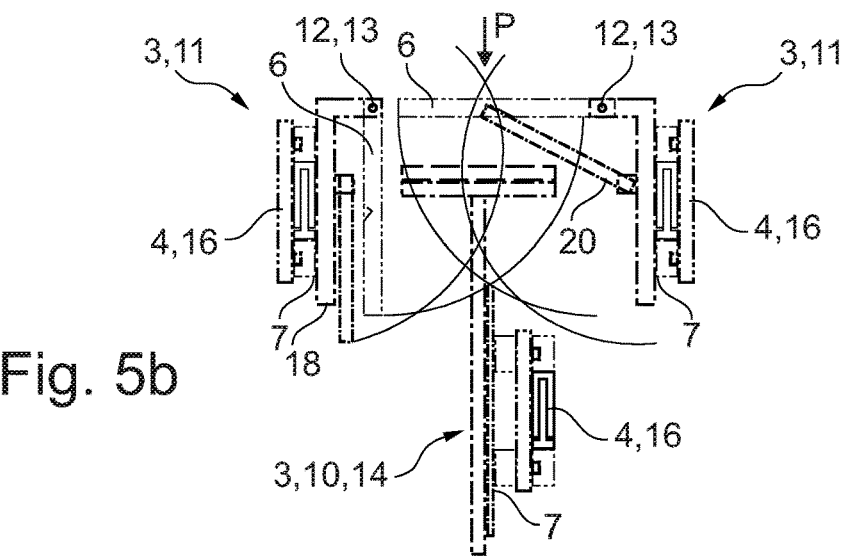

The two pivotal displacement axis devices 11 are arranged on both sides of the station path S and each have the component receiving portion 6, which can be pivoted through 90° via the pivot region 12, which is configured in this case as a pivot axis 13 that is parallel to the main transport direction H. In the transport position, as shown for the left-hand pivotal displacement axis device 11 in FIG. 5*a*, the component receiving portion 6 is oriented normally and/or perpendicular to the process direction P. For the special case in which the process direction P is vertical, the component receiving portion 6 is oriented horizontally. In FIGS. 5*b* and *c*, the same pivotal displacement axis device 11 is in the avoidance state, wherein the component receiving portion 6 is pivoted back through 90°. For the special case in which the process direction P is vertical, the component receiving portion 6 is oriented vertically. The other pivotal displacement axis device 11 is symmetrical to and/or a mirror image of the first pivotal displacement axis device 11 and is arranged on the opposite side of the station path S. In FIGS. 5*a* and *c*, the component receiving portion 6 is in the avoidance state, and in FIG. 5*b*, the component receiving portion 6 is in the transport position.

Figure 5C:
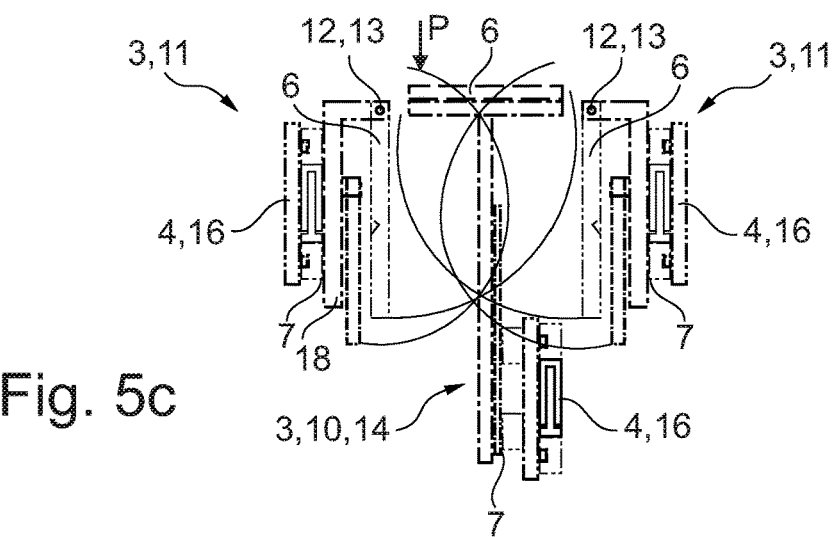

The stroke displacement axis device 14 is arranged centrally between the two pivotal displacement axis devices 11 and is in the avoidance state in FIGS. 5*a* and *b* and in the transport position in FIG. 5*c*. The transition from the avoidance state to the transport position takes place by way of a vertical displacement and/or a displacement counter to the process direction P, meaning that the spatial direction R or the projection direction R' is opposite the process direction P.

During operation, the first pivotal displacement axis device 11 is first brought into the transport position in the region of the loading station B and can then be processed along the station path S in the component station 2. The other pivotal displacement axis device 11 is then brought into the transport position and processed along the station path S in the component station 2. While said other pivotal displacement axis device 11 is being processed, the component receiving portion 6 of the first pivotal displacement axis device 11 can be unloaded, in particular in the unloading station E, and transferred to the avoidance state. The component receiving portion 6 of the stroke displacement axis device 14 is then brought into the transport position and processed along the station path S in the component station. While said component receiving portion 6 is being processed, the component receiving portion 6 of the first pivotal displacement axis device 11 can be loaded again in the loading station B and transferred to the transport position.

The three component receiving portions 6 shown can be arranged in any desired order, i.e., randomly, along the station path S. Optionally, in addition, the conveying system 1 can include a further linear displacement axis device 10, as shown in FIG. 4, which can provide a fourth component receiving portion 6.

The axis devices 3 shown in FIGS. 5*a, b* and *c* and optionally the additional linear displacement axis device 10 can have respective supply apparatuses 15, for example configured as drag chains, which can be moved independently of one another during the oscillating movement of the linear shaft apparatuses 4. The axis devices 3 are arranged laterally offset from one another.

Each component receiving portion 6 is supported on a holder 18 via a support 20 in order to achieve sufficient mechanical rigidity for the component receiving portion 6. The support 20 is configured as a strut which is folded away in the avoidance state.

FIG. 6 shows a possible design of the conveying system 1 with the three axis devices from FIGS. 5*a, b* and *c*. In addition to the components in the preceding figures, the component station 2 and a frame 17 can now be seen, to which the respective linear shaft apparatuses 4 and/or the guides 16 are fixed. In addition, the supply apparatuses 15, configured as drag chains, are shown, which are arranged in parallel with one another.

Figure 7A:
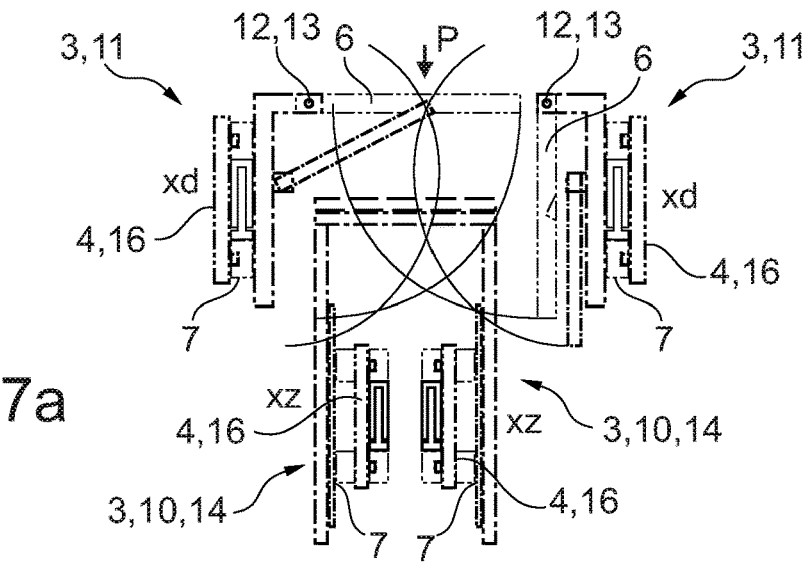
FIGS. 7a to c are highly schematized front views of conveying systems as further exemplary embodiments of the invention.
Figure 7B:
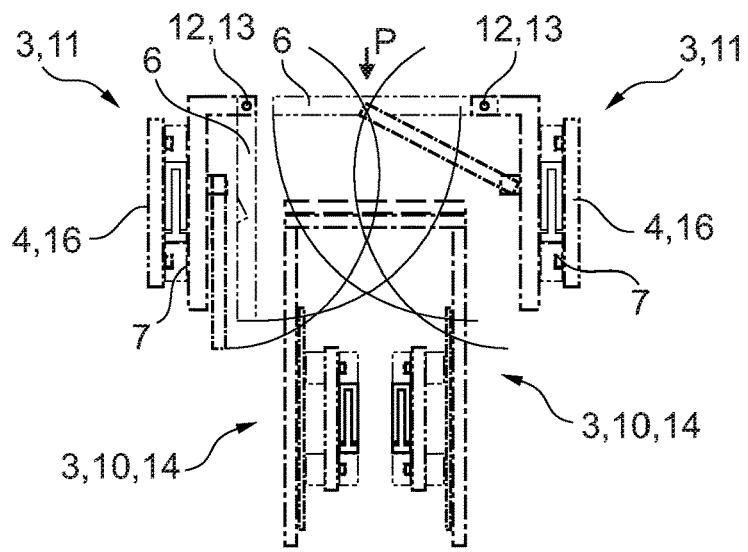
Figure 7C:
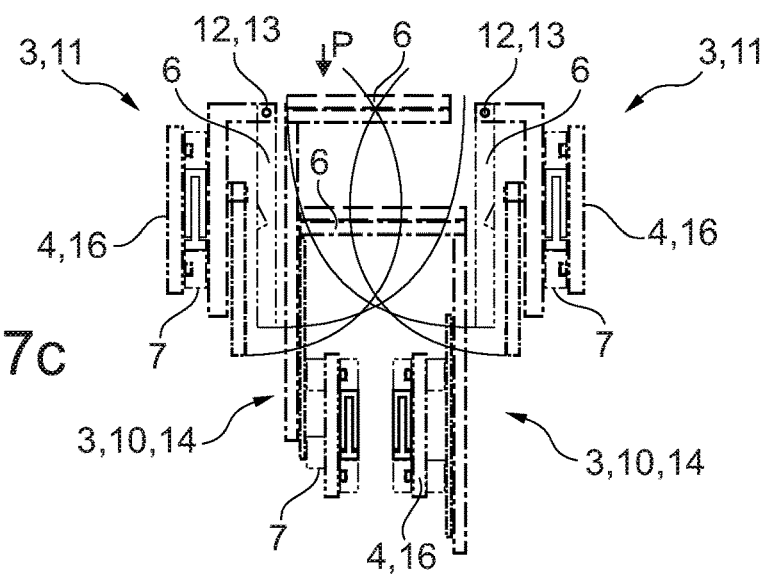

FIGS. 7*a, b* and *c* show a further exemplary embodiment of a conveying system 1, wherein said conveying system 1 has four axis devices 3, two of the axis devices 3 are each configured as pivotal displacement axis devices 11 and two of the axis devices 3 are each configured as linear displacement devices 10, in this exemplary embodiment example as a stroke displacement axis device 14.

The two pivotal displacement axis devices 11 and one of the stroke displacement axis devices 14 are identical in design to those in the conveying system 1 in the preceding figures; therefore, reference is made to the corresponding description.

The present conveying system 1 has been supplemented with a further stroke displacement axis device 14, wherein said further stroke displacement axis device 14, is arranged mirror-inverted and/or symmetrically in relation to the existing stroke displacement axis device 14. The two stroke displacement axis devices 14 use the same return volume during the return operation when the component receiving portions 6 are in the avoidance state; thus, said stroke displacement axis devices have a predetermined sequence. The component receiving portions 6 of the pivotal displacement axis devices 11 can be inserted randomly in the conveying system 1 in FIGS. 7*a, b* and *c*, and the sequence for the component receiving portions 6 of the stroke displacement axis devices 14 cannot be changed.

Figure 8:
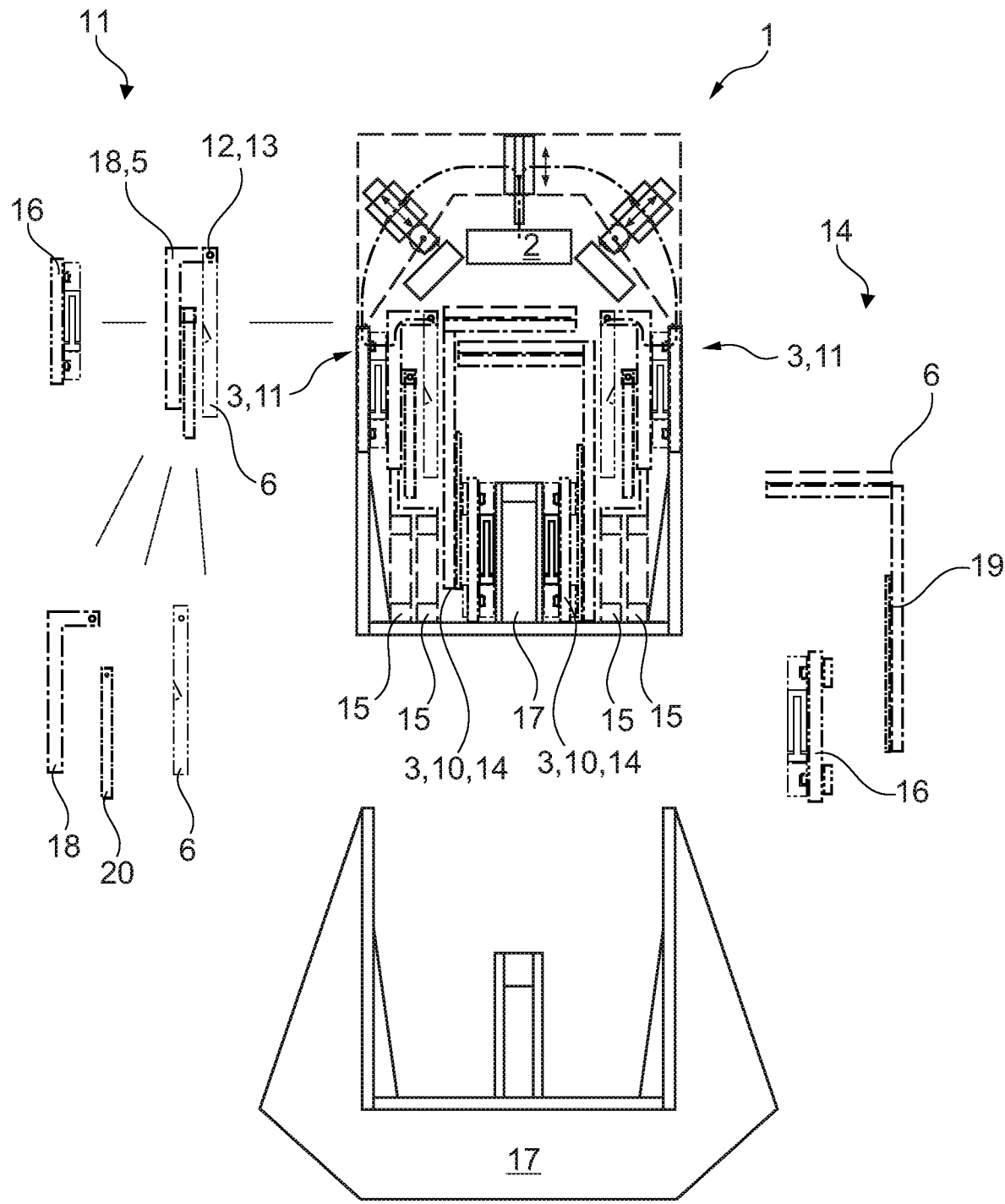
FIG. 8 is a highly schematized front view of a conveying system as one exemplary embodiment of the invention.

FIG. 8 shows a possible design of the conveying system 1 with the four axis devices from FIGS. 7*a, b* and *c*. In addition to the components in the preceding figures, the component station 2 and a frame 17 can now be seen, to which the respective linear shaft apparatuses 4 and/or the guides 16 are fixed. In addition, the supply apparatuses 15, configured as drag chains, are shown, which are arranged in parallel with one another. As with the embodiment in FIG. 6, instead of the two stroke displacement axis devices 14, two linear displacement axis devices 10, such as those shown in FIG. 3b, can be integrated, for example.

Shown downwardly offset is the frame 17, which has two side regions and a central connecting portion for the arrangement of the axis devices 3. On the left side, one of the pivotal displacement axis devices 11 is shown; it can be seen that the component receiving portion 6 is pivoted about the pivot axis 13 on a holder 18, wherein it is possible to place a support 20 diagonally between the holder 18 and the component receiving portion 6. The support 20 can be integrated but is alternatively implemented as an articulated joint. The holder 18 can be cantilevered to integrate the feed apparatus 5 and/or provide space for the reinforcement 20. On the right side, the component receiving portion 6 of the stroke displacement axis device 14 is shown, which is configured as an L-shaped component. The component receiving portion 6 can be moved vertically by the feed apparatus 5 (not shown) via a stroke guide rail 19. The axis devices 3 in FIG. 6 can be configured in the same way.

Figure 9A:
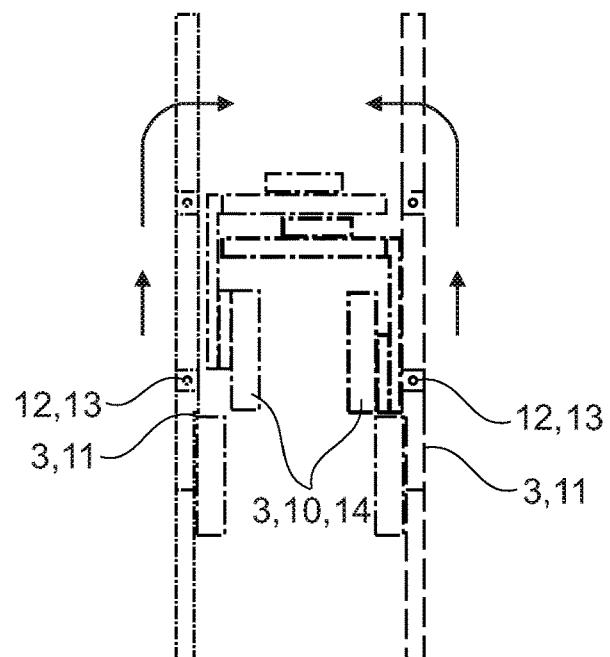
FIGS. 9a, b are highly schematized front views of conveying systems as further exemplary embodiments of the invention.

FIGS. 9a and b illustrate a further variant of pivotal displacement axis devices 11. FIG. 9a shows an exemplary embodiment of the conveying system 1 with two pivotal displacement axis devices 11 and two stroke displacement axis devices 14. The stroke displacement axis devices 14 are configured as previously described. In contrast with the preceding exemplary embodiments, the pivotal displacement axis devices 11 are each configured as a stroke/pivotal displacement axis device, wherein the component receiving portions 6 are not only pivoted but additionally are displaced in a linear direction in order to be able to retract said component receiving portions in the avoidance state.

Figure 9B:
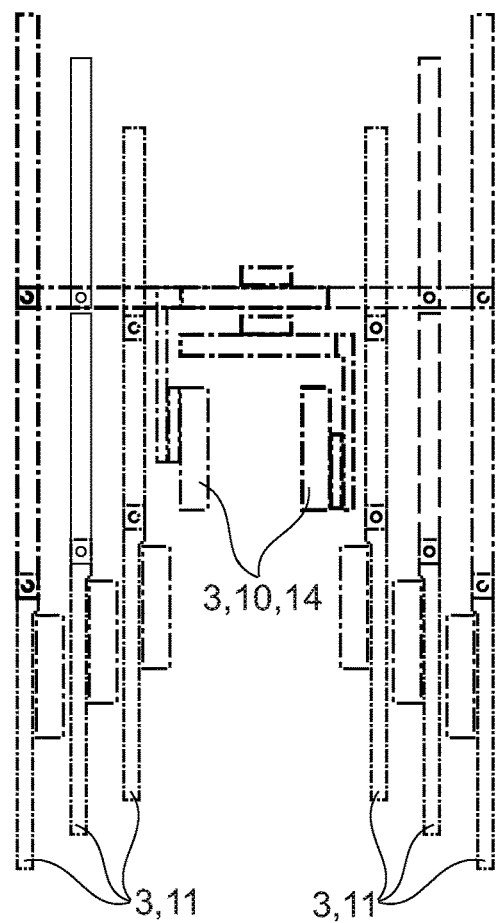

The advantage of this design can be seen in FIG. 9b, in which a total of six pivotal displacement axis devices 11 are shown, each of which is configured as a strike/pivotal displacement axis device. The component receiving portions 6 have different widths in relation to a direction transverse to the main transport direction, specifically in the transport position, wherein the component receiving portions 6 arranged further outwards is wider than the component receiving portions 6 arranged further inwards. The pivotal displacement axis devices 11 are arranged on both sides in a clamp-like manner around the station path S and/or the stroke displacement axis devices 14. During the transfer from the avoidance state to the transport position, the respective component receiving portions 6 are first moved linearly and are then folded about the pivot region 12 or the pivot axis 13. This transfer can also be a combined and/or superimposed pivoting/linear movement. In a cost-effective embodiment, this combined movement can be carried out with an actuator. The combined movement can be used with the pivotal displacement device 11, the linear displacement device 10 and/or the stroke displacement device 14. During the transfer from the transport position to the avoidance state, respective component receiving portions 6 are folded back and are then moved linearly so as to be arranged flush or below flush with the transport position. This makes it possible for the externally arranged stroke/pivotal displacement axis devices to also bring the respective component receiving portions 6 into the transport position. The stroke directions of the pivotal displacement axis devices 11 are oriented in parallel with one another and/or in the same direction as the process direction P.

Figure 10A:
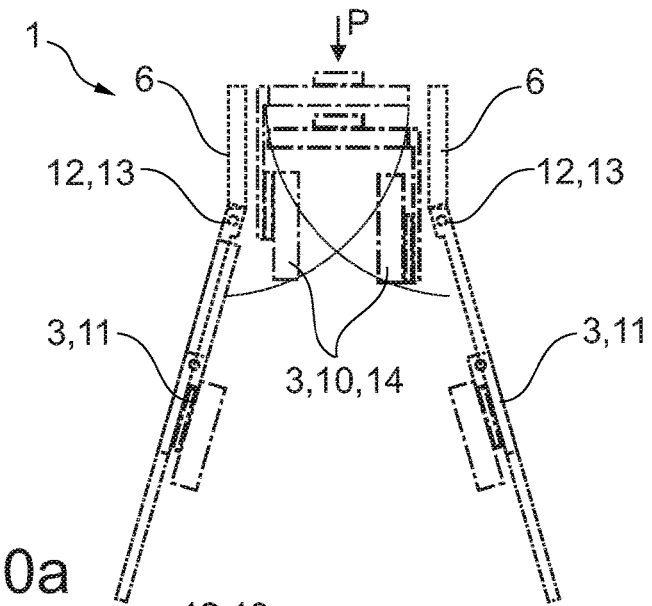
FIGS. 10a and b are highly schematized front views of conveying systems as further exemplary embodiments of the invention.

FIG. 10a shows a conveying system 1 which, as in the previous figures, has two central stroke displacement axis devices 14 and, in addition, two pivotal displacement axis devices 11, which are configured as stroke/pivotal displacement axis devices. The stroke/pivotal displacement axis devices are arranged on both sides of the stroke displacement axis devices 14. However, the linear movement and/or the stroke movement of the stroke/pivotal displacement axis devices are oriented at an angle to the process direction P and/or inversely oriented in relation to one another in a V-shape. In order to save installation space, the component receiving portions 6 can be moved in such a way that, in the axial plan view shown, the pivot regions 12 are each arranged congruently with the position of the component receiving portion 6 of the stroke displacement axis device 14 in the transport position.

Figure 10B:
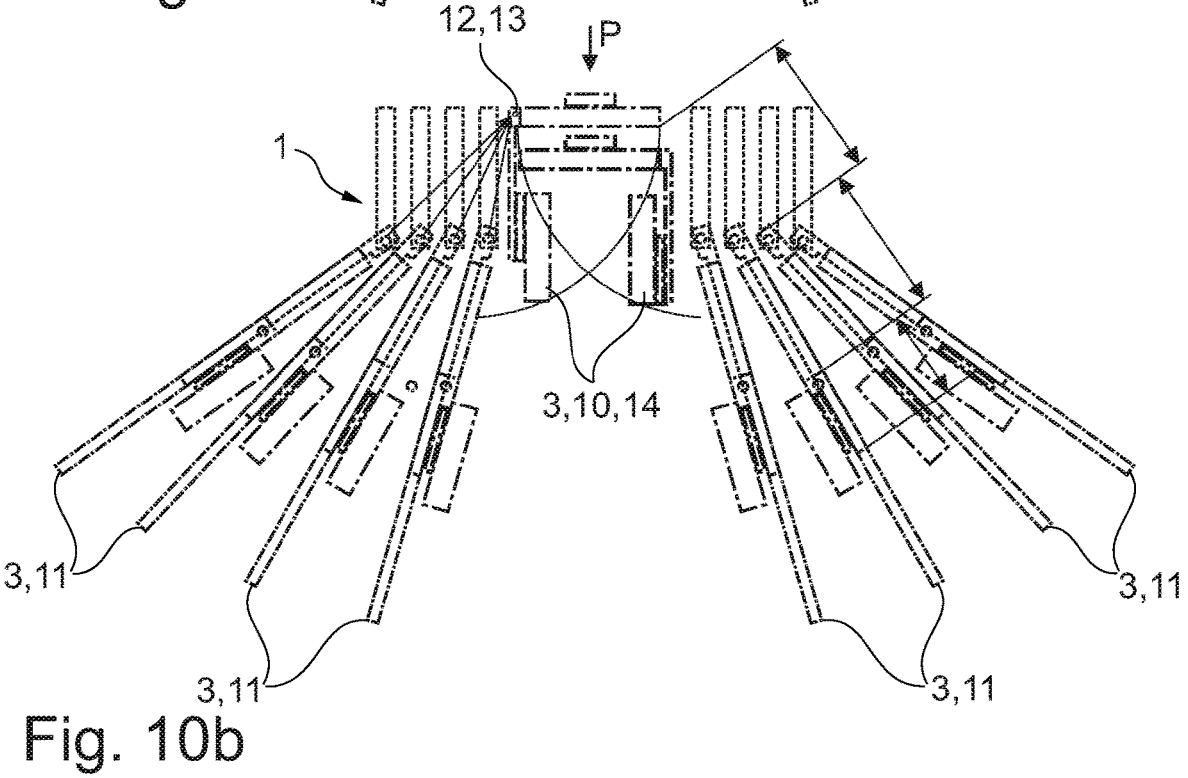

FIG. 10b shows a conveying system 1 which, as in the conveying system 1 in FIG. 10a, is provided with two central stroke displacement axis devices 14. Instead of only two pivotal displacement axis devices 11, however, eight pivotal displacement axis devices 11 are provided in FIG. 10b, each of which is configured as a stroke/pivotal displacement axis device, and wherein four of these axis devices 3 are arranged on each side of the central stroke displacement axis device 14. On each side, the stroke/pivotal displacement axis devices each have a different set angle. However, the component receiving portions 6 are all as wide as one another. It is provided for the pivot region 12 or the pivot axis 13 to be able to be set to the same position on each side by the stroke movement and/or linear movement.

Optionally, in addition, the conveying systems 1 in FIGS. 9a and b and 10a and b can have further linear displacement axis devices 10 as shown in FIGS. 3a to d.

In the case of the conveying systems 1 shown in the drawings, the component receiving portions 6 of at least two axis devices 3 can always be arranged and/or arrangeable laterally offset from one another. This allows the component receiving portions 6 to move past one another and/or past other component receiving portions 6 and/or past the station path S without colliding in the avoidance state. In particular, the respective carriage assemblies 7 use different return volumes in the region of the station path S, wherein the return volumes of the two laterally spaced axis devices 3 are arranged spaced apart from one another and/or so as not to overlap. The axis devices 3 that use a dedicated return volume through which no other component receiving portion 6 passes can randomly arrange their respective component receiving portions 6 for the station path S.

In the conveying systems 1 shown in the drawings, at least two linear displacement axis devices 10 can be provided or can be additionally integrated. One of the linear displacement axis devices 10 can be configured as a stroke displacement axis device 14. The linear displacement axis devices 10 move the component receiving portion 6 in a linear and/or straight-lined spatial direction R. The spatial direction A defines a projection direction R'. In the conveying systems shown, the projection directions R' are different for at least two linear displacement axis devices 10. "Different" can be mean an angular offset or even an antiparallel arrangement. There can be an intermediate angle not equal to 0°, 90° or 180° between the projection directions. In particular, the intermediate angle can be selected as desired. The angle can be, for example, an obtuse or acute intermediate angle.

In the conveying systems 1 shown, at least one of the axis devices 3 can be configured as the pivotal displacement axis device 11. For example, the component receiving portion 6 is configured as an extension arm. As shown in the drawings, the component receiving portion 6 can be folded from the transport position to the avoidance state, i.e., pivoted in the direction of the linear displacement axis device 10. Alternatively, the component receiving portion 6 can also be unfolded in the reverse direction.

Figure 11:
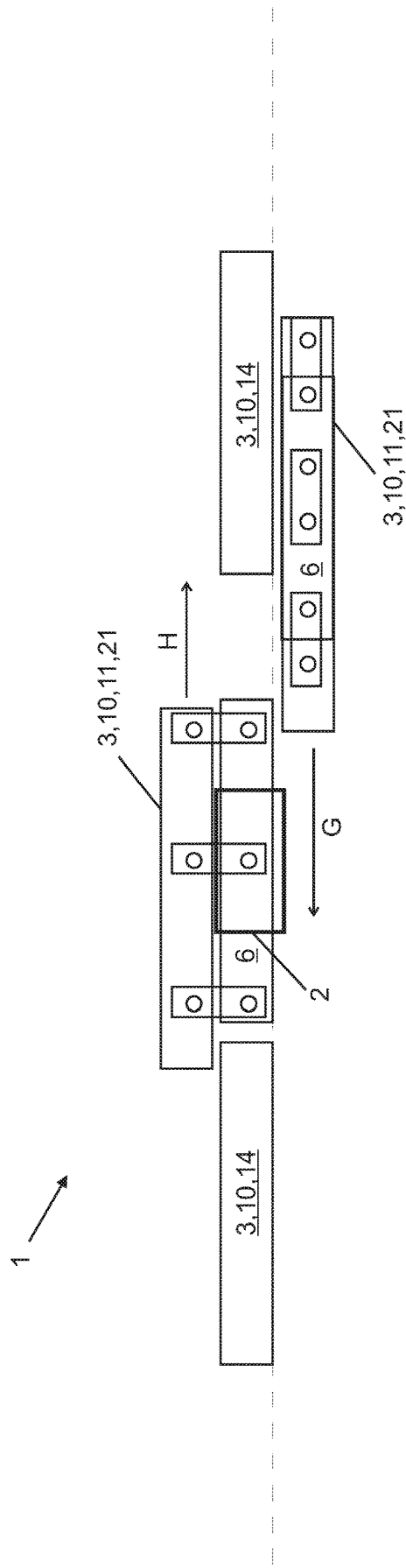
FIG. 11 is a highly schematized plan view of a conveying system as a further exemplary embodiment of the invention.

FIG. 11 is a schematic plan view of a conveying system 1 from above as another exemplary embodiment of the invention. The conveying system 1 has four axis devices 3, wherein two of the axis devices 3 are configured as stroke displacement axis devices 14, as previously described.

The remaining two axis devices 3 are configured as linear pivotal axis devices 21, wherein said linear pivotal axis devices 21 are implemented both as linear displacement axis devices 10 and as pivotal displacement axis devices 11. In the case of the linear pivotal axis devices 21, each component receiving portion 6 is pivoted by the feed apparatus 5 in the carriage assembly 7. The pivoting is coplanar and/or in a common plane as occupied by the component receiving portion 6 in the transport position. By the pivoting, the component receiving portion 6 is displaced in parallel in the common plane such that, by means of the two linear pivotal axis devices 21, the component receiving portions 6 each define a projection direction in the projection plane perpendicular to the main transport direction, said projection directions being different and being oriented in opposite directions in the present case. Thus, the linear pivotal axis devices 21 can be configured as linear displacement axis devices 10. At the same time, the linear pivotal axis devices 21 can be referred to as pivotal displacement axis devices 11 since the component receiving portions 6 are pivoted about a further pivot region, said further pivot region being oriented perpendicular to the aforementioned common plane. When moving down the station path S in the main transport direction H, the component receiving portions 6 are in an extended pivoted state and thus in the transport position; in the reverse direction, the component receiving portions 6 are in a retracted pivoted state and thus in the avoidance state.

The pivotal displacement axis devices 11 can be integrated in any of the conveying systems 1 in the preceding figures.

Thus, the conveying systems 1 in particular allow components, in particular materials, to be positioned and transported relative to a process unit in the component station 2, in particular during continuous transport, e.g. for:
printing on surfaces of components
measuring surfaces of components
digitizing surface structures, colors and properties of components
other processing, treatment or analysis of component surfaces
processing materials in a continuous or cyclic mode of operation.

The underlying function can be summarized as follows:
Circulating movement of the component holders or component receiving portions 6, although they are optionally provided with a cable drag chain as a supply apparatus 15;
Continuous material movement under the process head (discharge side comparable to continuously running conveyor belt) or in component station 1;
Extension of the process head and/or the component station 2 over a larger area, different working zones that have to cover one and the same area on the component and must be locally adjusted to one another
Highly precise guidance of the component receiving portions 6 in the direction transverse to the conveying movement or main transport direction;
Highly uniform movement possible in the region of the process unit or component station 2;
High conveying speed of more than 1.5 m/s (example: 0.5 second process time for a component length of 0.5 m, 2 second process time for a component length of 2 m) possible;
Scalable in terms of the speed and formats of the component;
Being able to record the surface of the component in such a way that a defined position can be reached (either known or "frozen" so that it is possible to take a preliminary measurement of the position and orientation as well as possible deformation effects);
Rigid connection to the process unit or component station 2 to enable highly reproducible relative positioning of the component and process unit or component station 2.

details of the essential requirements:
Preferably, components, in particular materials, have to be precisely positioned relative to the process unit or component station 2. A particular requirement is that the components are moved along under the process unit or component station 2 at a constant speed, meaning that highly uniform movement is required both transverse to the conveying direction and longitudinally with respect to the conveying direction. The process may require that the component can be moved with a max. permissible dynamic deviation in the range of approx. 5 μm/13 ms.
The costs of the process unit or component station 2 can be very high, meaning that maximum utilization of the process unit or component station 2 (ideally without interruptions) is the first optimization goal both in terms of process stability and the competitiveness of the system.
The components to be processed are preferably mostly elongate since the process unit or component station 2 should be configured to be as narrow as possible in the interest of investment costs.
The process unit or component station 2 can reach a length of more than 2 m in order to cover the entire width of the component in a staggered manner so that processing is possible in a single pass.
The components to be processed can be fixed on the material transport unit, in particular to the component receiving portion 6, in order to shape the components or to fix the current shape so that preventive measurement is possible.

In particular, the conveying system 1 is configured as an embodiment of a shuttle system that makes it possible to work with more than two shuttle units as component holders 8, meaning that the low process time can be reduced.

Possible variant: Supplementing the two shuttles rotating around one another in the case of the stroke displacement axis device 14 with shuttles that can be inserted from the side (two shuttles rotate vertically around one another, one or two shuttles rotate horizontally around the vertical shuttles)

Possible variant: Supplementing the preceding variants with shuttles which are arranged at spatial angles and make it possible to place a plurality of the rotating loops one inside the other on one side (push into the process path, pass through for processing, move out of the process path, and move back to a "free" return path) Possible variant: System configuration equipped with additional fold-away shuttles or equipped entirely with fold-away shuttles, configured as pivotal displacement axis devices 11, so that the shuttles can start their return journey folded away. In terms of precision, this has the decisive advantage that the installation space is minimized and the force flow to the process unit or component station 2 can be shortened, thus significantly increasing the properties of the system in terms of precision and reproducibility.

Due to the ability of the shuttle to be operated with a cable drag chain as a supply apparatus 15, the design makes it possible in principle to add any additional follow-along sensors or actuator units, e.g. grippers, sensors and an axis system for degrees of freedom in component orientation.

Due to the increased number of shuttles, it is possible to gain time for loading and unloading the shuttles without the process unit or component station 2 having to wait for this process (the more shuttles, the faster it is possible to pass through the process unit or component station 2)

Optionally or in a preferred embodiment, the invention may be set out as follows:

A shuttle system as a conveying system 1 having more than two shuttles, in which all shuttles can pass through under a shared process unit or component station 2 the shuttles are permanently connected to the frame (e.g. via a cable drag chain, guide rail)

the movement of the shuttles is guided transversely to the conveying direction by a guide rail with a high degree of precision the shuttles can move through the process unit at a constant speed or alternatively be positioned in the process unit in a cyclic manner the shuttles move sequentially through the process unit (there are only minimal gaps between the shuttles)—the order is mostly fixed but can be changed if necessary a loading and unloading interface is provided for loading the shuttles in the machine at one or two distributed locations.

LIST OF REFERENCE SIGNS

1 Conveying system
2 Component station
3 Axis device
4 Linear shaft apparatus
5 Feed apparatus
6 Component receiving portion
7 Carriage assembly
8 Component holder
9 Component
10 Linear displacement axis device
11 Pivotal displacement axis device
12 Pivot region
13 Pivot axis
14 Stroke displacement axis device
15 Supply apparatus
16 Guide for the carriage assembly
17 Frame
18 Holder
19 Stroke guide rail
20 Support
21 Linear pivotal axis device
H Main transport direction
G Reverse direction
B Loading station
E Unloading station
S Station path
P Process direction
PE Projection plane
R Spatial direction
R' Projection direction

The invention claimed is:

1. A conveying system, comprising: at least three axis devices for transporting component receiving portions for receiving a component and/or a component holder on a station path along a main transport direction in a component station,
    wherein the axis devices each have a carriage assembly having one of the component receiving portions and having a feed apparatus for feeding the one component receiving portion from an avoidance state to a transport position, and
    each have a linear shaft apparatus for moving the one component receiving portion in the transport position along the station path in the main transport direction and for returning the one component receiving portion in the avoidance state in a reverse direction,
    at least two of the axis devices being configured as linear displacement axis devices which linearly move the one component receiving portion in a spatial direction of the feed apparatus, the spatial directions each defining a projection direction in a projection plane perpendicular to the main transport direction, wherein the projection directions are different, wherein there is an obtuse or acute intermediate angle between the projection directions of two of the linear axis devices.

2. The conveying system according to claim 1, wherein the linear displacement axis devices carry out a parallel displacement of the one component receiving portion.

3. The conveying system according to claim 1, wherein, when the linear shaft apparatus is stationary, the spatial directions lie in a linear displacement plane perpendicular to the main transport direction and/or are oriented substantially perpendicular to the main transport direction.

4. The conveying system according to claim 1, wherein the spatial directions and/or the projection directions of two of the linear axis devices are oriented antiparallel or substantially antiparallel with one another and/or opposite to one another.

5. The conveying system according to claim 1, wherein one of the axis devices is configured as a pivotal displacement axis device for pivoting the one component receiving portion about a pivot region in order to move the one component receiving portion from the avoidance state to the transport position and/or in the reverse direction.

6. The conveying system according to claim 5, wherein the one component receiving portion is configured as an extension arm which can be pivoted about the pivot region from the transport position to the avoidance state and/or in the reverse direction.

7. The conveying system according to claim 5, wherein the pivot region has the same orientation as the main transport direction.

8. The conveying system according to claim 1, wherein the tool receiving portions are arranged and/or arrangeable laterally offset from one another in the region of the station path in the avoidance state.

9. The conveying system according to claim 1, wherein the component receiving portions are arranged laterally offset from one another in the avoidance state in such a way as to be able to travel, in the region of the station path without collision, past one another and/or past a component receiving portion moving through the station path.

10. The conveying system according to claim 1, wherein the component receiving portions can be arranged randomly along the station path.

11. The conveying system according to claim 1, wherein the axis devices each have a supply apparatus for supplying the carriage assembly with energy and/or signal communication, wherein the supply apparatus is continuously connected to the carriage assembly when the axis device is in operation.

12. The conveying system according to claim 1, wherein the component holders are configured as active component holders that are supplied with energy and/or signal communication.

13. The conveying system according to claim 1, wherein the linear displacement axis device is configured as a stroke displacement axis device, wherein the one component receiving portion is displaceable vertically and/or in the process direction.

14. The conveying system according to claim 1, comprising two stroke displacement axis devices and at least one linear displacement device and/or at least one pivotal displacement axis device.

\* \* \* \* \*